US009209730B2

(12) United States Patent
Scipio et al.

(10) Patent No.: US 9,209,730 B2
(45) Date of Patent: Dec. 8, 2015

(54) GAS TURBINE UNDER FREQUENCY RESPONSE IMPROVEMENT SYSTEM AND METHOD

(71) Applicant: General Electric Company, Schenectady, NY (US)

(72) Inventors: Alston Ilford Scipio, Mableton, GA (US); Dale J. Davis, Greenville, SC (US); Steven Hartman, Marietta, GA (US); Sanji Ekanayake, Mableton, GA (US); Paul Robert Fernandez, Woodstock, GA (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 13/751,689

(22) Filed: Jan. 28, 2013

(65) Prior Publication Data

US 2014/0210217 A1  Jul. 31, 2014

(51) Int. Cl.
| | |
|---|---|
| *G05D 11/00* | (2006.01) |
| *H02P 9/04* | (2006.01) |
| *F02C 9/26* | (2006.01) |
| *F02C 9/46* | (2006.01) |

(52) U.S. Cl.
CPC ... *H02P 9/04* (2013.01); *F02C 9/26* (2013.01); *F02C 9/46* (2013.01); *Y02E 10/763* (2013.01)

(58) Field of Classification Search
CPC ............... H02P 9/04; F02C 9/46; F02C 6/26; Y02E 10/763
USPC .......................................... 700/287, 289–290
See application file for complete search history.

(56) References Cited

U.S. PATENT DOCUMENTS

| | | | |
|---|---|---|---|
| 2,987,876 A * | 6/1961 | Williams et al. ................ 60/237 |
| 4,732,114 A * | 3/1988 | Binder et al. ............... 123/25 E |
| 5,867,977 A | 2/1999 | Zachary et al. |
| 5,930,990 A | 8/1999 | Zachary et al. |
| 6,038,848 A * | 3/2000 | Frutschi ......................... 60/775 |
| 6,173,564 B1 | 1/2001 | Zachary |
| 6,553,768 B1 | 4/2003 | Trewin et al. |
| 2007/0220900 A1* | 9/2007 | Shockling et al. .............. 60/802 |
| 2008/0047275 A1 | 2/2008 | Ziminsky et al. |
| 2008/0247885 A1 | 10/2008 | Hagen |
| 2009/0320440 A1 | 12/2009 | Erickson et al. |
| 2010/0326399 A1 | 12/2010 | Pendray |

* cited by examiner

*Primary Examiner* — Kenneth M Lo
*Assistant Examiner* — Chad Rapp
(74) *Attorney, Agent, or Firm* — Ernest G. Cusick; Frank A. Landgraff

(57) ABSTRACT

A system and method is provided that improves the under frequency response of gas turbines by providing a fast-response power augmentation system. The system includes a tank storing a blended mixture of motive fuel such as ethanol or methanol and demineralized water in a predetermined ratio that is provided as a diluent to be injected into the compressor bellmouth, the Compressor Discharge Chamber (CDC), and/or the combustion system via one to three dedicated circuits. To achieve the instantaneous injection of the diluent at the correct pressure and for the appropriate duration to meet the needs of the gas turbine Grid compliance mandate, an accumulator is used as the motive force to drive the augmentation fluid in the dedicated circuits. The injected diluent is microprocessor controlled to either be simultaneous into all three circuits or is sequenced based on a determination of the best turbine control and performance.

13 Claims, 3 Drawing Sheets

GAS TURBINE UNDER FREQUENCY RESPONSE IMPROVEMENT SYSTEM AND METHOD

TECHNICAL FIELD

The subject matter disclosed herein relates generally to systems and methods for controlling the operation of gas turbines and, more specifically, to an under frequency response improvement system for gas turbines.

BACKGROUND

Although each electric power generator that is connected to the Electricity Transmission and Distribution Network or "Grid" may function individually, each generator is constrained by one key parameter that makes it a part of a team of generators. The key factor that is common to the Grid and all individual generators is the frequency. Although the grid frequency changes, the goal is for it to be maintained within a narrow range for transmission network system stability. Normal allowable variations of the Grid frequency are limited to a very small range of ±0.5 Hz or less. With this in mind, it can be surmised that at any point in time all of the generators connected to the Grid run at the same speed or in a "synchronized" mode.

To maintain frequency stability, 50 Hz Grid codes as a standard mandates an increase in generated output of 4%-6% in 4-5 seconds when the frequency falls below a certain value, for example, 49.5 Hz for a 50 Hz system. These codes also stipulate that power output must be maintained down to a predetermined value, for example, 48.5 Hz for a 50 Hz system. In addition, if any further decrease in frequency occurs, below this value a decrease in generated output of 5 percent at a frequency of 47 Hz is provided for machine protection, Grid recovery and stability. Those skilled in the art will appreciate that this concept also holds true for a 60 Hz system with a typical 1% frequency regulation requirement where the low frequency classification comprises a frequency ranging from 57.8 Hz to about 59.5 Hz.

A frequency that is not a fixed value can be simply explained as the change in direction of the current flow in an AC (alternating current) system. Grid frequency is directly linked to the speed of rotation of the generators and is also indicative of normal fluctuations in the balance between power generation and consumption. For example, the generators on 50 Hz systems rotate at a speed of 3000 rpm because the rotor in the generator has two poles and thus 3000 rpm is 50 revolutions per second, or in every second the single magnetic field cuts the stator coils 50 times.

If several of the turbine generators cannot increase speed due to capacity limitations, other generators on the Grid will be required to compensate. When all the generators reach their Grid supply/contribution capacity limitation, or if there is a loss of generation or a large increase in load, the Grid can start operating at a lower frequency. This is an indication that the Grid is overloaded and demand/generator output changes are required to maintain Grid stability. In turn, a decrease in rotational speed results in reduced volumetric flow/mass-flow by the gas turbine compressor and a reduction in gas turbine output. When this situation occurs, appropriate measures are typically implemented immediately to compensate for this behavior.

For example, to meet under-frequency induced power output increase requirements, gas turbine OEMs have utilized several measures that can be implemented at short notice to increase power output. The standard approach is to rapidly open the Inlet Guide Vanes (IGVs) on the compressor while simultaneously increasing fuel flow to increase turbine speed. However, this traditional response can only provide limited increase in power of approximately 1%-2% and depends on the loading of the turbine generator—base load or part load—at the time of the disturbance, and the turbine's ability to exceed its firing limitations by peak or over firing.

Gas turbines are generally connected to the electrical power grid/network in droop mode (4% standard) with the primary goal of supplying adequate power and maintaining the Grid frequency within set operating limits for Grid operational stability. Grid instabilities attributable to large losses or additions in connected generation or loads have a significant impact on the Grid frequency. Depending on the nature of the load or generation change, the system frequency will either increase or decrease. In droop mode, these changes in the Grid frequency will cause the gas turbine to either increase or decrease power production in order to maintain the desired grid frequency.

As the connected electrical load on the Grid increases, the generators tend to operate at a lower speed. This is compensated for by regular frequency control measures like the gas turbine controls supplying more fuel to the turbines while adjusting air flow to the compressor, thereby increasing the speed. For example, prior art under frequency response systems utilize the intrinsic benefits of wet compression to achieve power augmentation through increased mass flow derived by injection of water into the Compressor Discharge Chamber (CDC) and/or combustion system to increase air mass flow and to reduce air temperature. The cooling effect makes the air denser so as to enhance the compression ratio through "wet compression." The turbine may then run at full speed with artificially increased air density to achieve power augmentation.

In wet compression systems, the turbine controls are configured so that in conjunction with the simultaneous fuel and air increase, a spray of demineralized water is temporarily injected at the compressor inlet whenever there is a grid disturbance that requires additional power generation. The evaporation of the demineralized water cools the air flow entering the compressor inlet. The mass of this injected demineralized water increases the air density and consequently the mass flow through the compressor because of this cooling. However, rapid activation of these types of systems constitutes a challenge for the control systems to maintain optimum control because the increase in power output can only take effect at short notice if the gas turbine control and the water injection are perfectly coordinated. Moreover, conventional air flow augmentation systems do not generally augment the air flow fast enough to satisfy the above-mentioned standard mandates for response timing.

GE Patent Application No. 2008/0047275 A1 describes a control scheme to eliminate response lag due to changes in compressor air flow. The system determines a deviation of a Grid frequency from the standardized Grid frequency value and adjusts fuel flow from a portion of the fuel circuits while maintaining a substantially constant air flow from the compressor to facilitate control of the fuel to compressor discharge pressure ratio such that the combustor state does not lag changes in air flow when the combustor responds to the grid frequency deviation and so that the combustion flame is not lost.

During a Grid over-frequency event, fuel flow to the gas turbine is reduced to enable the turbine to meet the reduced power requirements of the Grid. Alternatively, a decrease in grid frequency attributable to lost generation or addition of a large load may result in an under-frequency event. To remedy this situation, the gas turbine will produce more power to stabilize the Grid. In such an event, fuel flow to the gas turbine must be increased to prevent instability within the gas turbine.

When a gas turbine operating at its maximum output capability is connected to the Grid, its ability to provide additional active power to support the Grid during an under frequency condition is limited. In such a situation, when the gas turbine is at its "maximum capability," it will have to be over fired or peak fired to meet the mandated percentile output increase grid support requirement. However, over firing a turbine has a detrimental impact on emission compliance combustion stability, and Hot Gas Path (HGP) component life through, for example, negative impact on the metallurgy of the turbine's internal components.

Frequency regulation and Grid Response Margin are mandated by numerous regulatory bodies globally. This margin is typically accomplished by peak firing the gas turbine above base load, to enable delivering 2-5% additional output above the nominal base load rating based on cycle configuration (simple or combined cycle). However, in some cases, the gas turbines are not capable of peak fire and a substantial percentage of these units are required to be de-rated below base-load capability in order to comply with the regional grid codes. For example, in order not to over fire a gas turbine to meet the needs of the Grid in under frequency conditions, it is common to de-rate the gas turbines to facilitate having a reserve margin (e.g., 5%) to allow boosting when needed to meet the fast power generating ramp rate for grid under frequency requirements. However, de-rating the gas turbines results in reduced efficiencies for the gas turbines and is thus costly and generally undesirable.

An improved method and system to enhance the under frequency Grid response capability of gas turbines and, more particularly, methods and systems for operating a gas turbine to provide improved faster grid under frequency support without de-rating the gas turbines is thus desired.

BRIEF DESCRIPTION OF THE INVENTION

A system and method is provided that improves the under frequency response of gas turbines by providing a fast-response power augmentation system. In exemplary embodiments, the system includes a tank storing a motive fuel such as a blended mixture of ethanol or methanol and demineralized water in a predetermined ratio that is provided as a diluent to be injected into the compressor bellmouth, the Compressor Discharge Chamber (CDC), and/or the combustion system via one to three dedicated circuits. This blended mixture serves the dual purpose of lowering the evaporation temperature as compared to water alone as well as simultaneously adding a fuel source to accommodate the increased air mass flow. To achieve the instantaneous injection of the diluent at the correct pressure and for the appropriate duration to meet the needs of the gas turbine Grid compliance mandate, an accumulator is used as the motive fuel to drive the augmentation fluid in the dedicated circuits. The injected diluent is microprocessor controlled to either be simultaneous into all three circuits or is sequenced based on a determination of the best turbine control and performance.

In a first exemplary embodiment, the accumulator is pressurized by compressor bleed and receives fluid injection at a compressor inlet of a power augmentation fluid such as a water/methanol or ethanol mix that is stored in a fluid storage tank and pumped into the accumulator to maintain predetermined levels. On the other hand, in a second exemplary embodiment, a dedicated accumulator pressurization pump is substituted in place of the compressor bleed and injects the power augmentation fluid to compressor discharge and/or the combustion system.

A power generation system disclosed herein includes a turbine engine connected to the power grid, a compressor that provides at least compressed air to the turbine engine, and a turbine engine control system. In an exemplary embodiment, the turbine engine control system includes sensors that monitor frequency fluctuations of the power grid from a standardized grid frequency value and a controller that adjusts fuel and air flow to the turbine engine in response to detected grid frequency fluctuations. The controller provides a motive fuel such as a mixture of water and ethanol or methanol to at least the compressor to augment mass flow to the turbine engine when the sensors detect an under frequency condition of the power grid. An accumulator stores the mixture of water and ethanol or methanol under pressure. Pressurization is provided by an air pressurization system that continuously charges the accumulator to a pressure that delivers effectively lag-free responsiveness in response to detection of an under frequency condition of the power grid. The air pressurization system may include a flow channel that provides compressor bleed to the accumulator under control of the controller or a variable frequency discharge air pump that is separate from the compressor.

In exemplary embodiments, the accumulator is arranged to selectively provide the mixture of water and ethanol or methanol via a first flow path to a bellmouth of the compressor, via a second flow path to the compressor discharge chamber at the output of the compressor, and/or via a third flow path to the combustion system of the turbine engine under control of the controller. The controller is programmed with a set of rules for controlling the delivery of the mass flow of the mixture that will be used for augmenting power output of the turbine engine in response to a detected under frequency condition on the power grid. Sensed values are processed based on a degree of detected under frequency variation and response time requirements and the processed output is used to selectively control the provision of the mixture of water and ethanol or methanol to the first, second and/or third flow path. The algorithm is implemented in the augmentation system control software that interfaces with the gas turbine control system that processes turbine operating parameters, grid frequency variations for determining the discharge pressure, and flow allocation rate for rationing the mixture of water and ethanol or methanol to the first, second and/or third flow paths in response to the detected under frequency condition.

A method of controlling the supply of fuel and air to a turbine engine and/or an air compressor is also described that provides compressed air to the turbine engine, where the turbine engine is connected to a power grid to provide generated power thereto. The method includes determining an under frequency deviation of the power grid from a standardized grid frequency value and adjusting mass augmentation air flow to at least the compressor by providing a pressurized motive fuel such as a mixture of water and ethanol or methanol to at least the compressor to augment mass flow to the turbine engine when the under frequency deviation of the power grid is detected. The method also includes selectively providing under program control the mixture of water and ethanol or methanol via a first flow path to a bellmouth of the compressor, via a second flow path to a compressor discharge chamber at an output of the compressor, and/or via a third flow path to a combustion system of the turbine engine under control of the controller. The program includes an algorithm based on turbine operating parameters, grid variations for determining the discharge pressure, and pressure degradation rate for rationing the mixture of water and ethanol or methanol to the first, second and/or third flow paths in response to the detected under frequency condition. The method further includes the step of maintaining constant air flow from the compressor by modulating inlet guide vanes and fuel flow to the compressor and turbine engine to facilitate controlling a fuel to compressor discharge pressure ratio such that a combustion state of the turbine engine does not lag changes in air flow when a combustor of the turbine engine responds to the under frequency deviation of the power grid.

The system and method described herein thus provides a turbine control system for maintaining a substantially constant air flow from the compressor to facilitate controlling a fuel to compressor discharge pressure ratio such that a combustor state does not lag changes in air flow when the combustion system responds to the grid frequency deviation. In exemplary embodiments, compressed air is used as a motive fuel driver for the initial response to the under frequency determination to provide lag-free responsiveness. In addition, an accumulator drives the combination of water and ethanol/methanol into one, two, or a combination of the three possible locations for controlling the turbine. After the initial response, a conventional motor may be used to provide continuous discharge while the accumulator is being recharged to support the motor if deemed necessary.

Other features and advantages of the claimed invention will be apparent from the following more detailed description of the preferred embodiments, taken in conjunction with the accompanying drawings which illustrate, by way of example, the principles of certain aspects of the claimed invention.

DETAILED DESCRIPTION OF THE INVENTION

The embodiments disclosed herein provide for improved under frequency response for gas turbines by providing a fast-response power augmentation system. In each exemplary embodiment, a tank storing a blended mixture of ethanol or methanol and demineralized water in a predetermined ratio is provided as a diluent to be injected into the compressor bellmouth, the Compressor Discharge Chamber (CDC), and/or the combustion system. To achieve the instantaneous injection of the diluent at the correct pressure and for the appropriate duration, an accumulator is used that receives a pressurized air supply from the compressor or from a separate air pump. The injection of the diluent is microprocessor controlled to either be provided as the mass flow augmentation fluid to one circuit, simultaneously provided into three circuits, or sequenced into the circuits based on a determination of the best turbine control and performance. The pressurized air, water and ethanol/methanol mixture atomizes faster to provide an instantaneous response.

The generator protection and control system and gas turbine controller includes sensors to determine the grid frequency to facilitate turbine speed and generator protection. A negative frequency variation from the standardized frequency value will trigger the turbine controller to adjust air and fuel flow to generate the appropriate incremental percentage of power to be in compliance with the grid code requirement. Embodiments for efficiently performing this function will be described below in connection with FIGS. 1-3.

Figure 1:
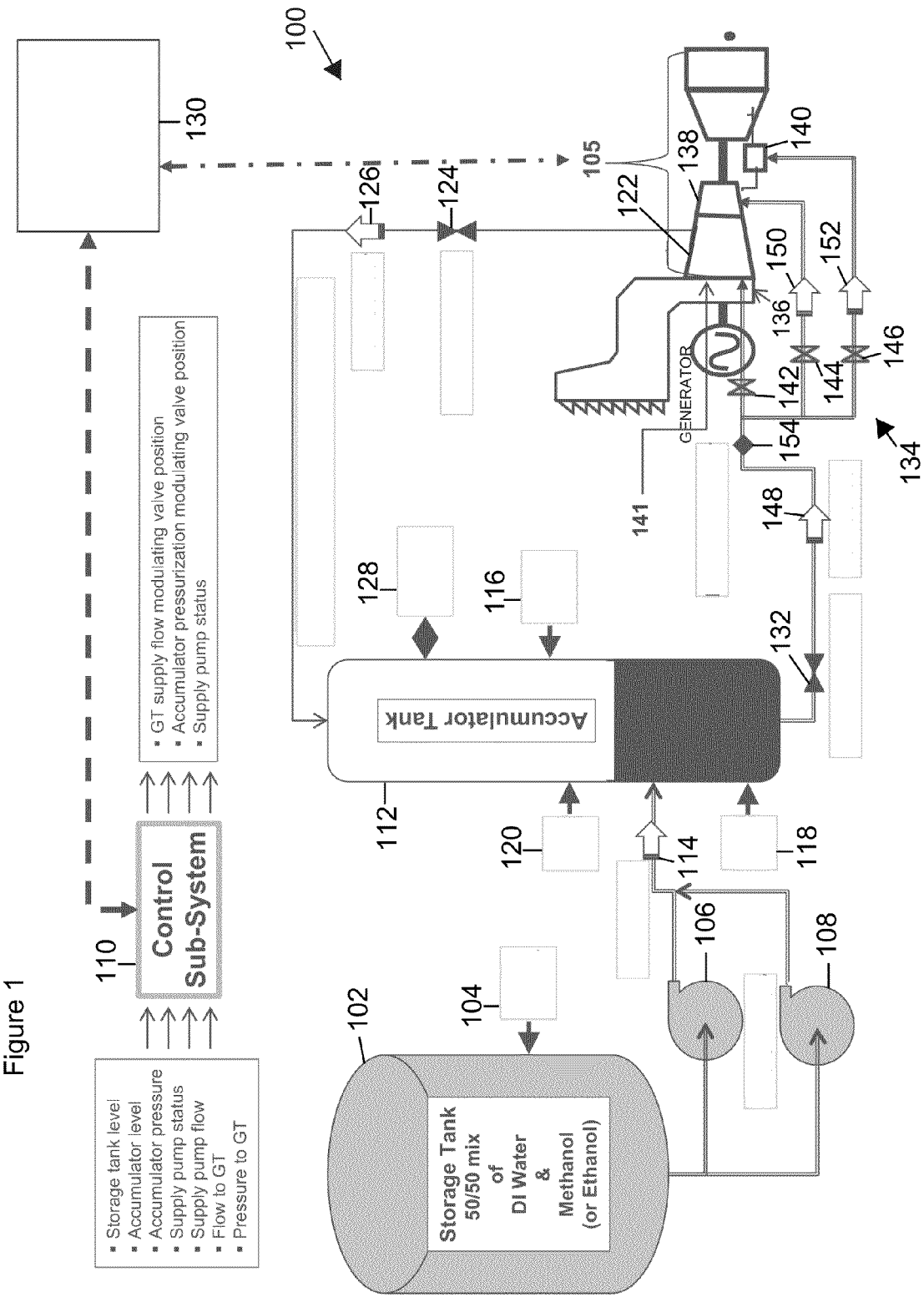
FIG. 1 illustrates a first embodiment of the under frequency response control system.

FIG. 1 illustrates a first embodiment of the under frequency response control system 100. The storage tank 102 in FIG. 1 holds a predetermined quantity of a blended (preferably homogeneous) mixture of ethanol or methanol and demineralized water in a predetermined ratio (e.g., 50/50). The quantity of the blended mixture is monitored by level sensor 104 and is based on the output requirement of the gas turbine 105, the flow requirements to meet the grid response output increase requirement, and duration of the required response mandated in the specific Grid code. As illustrated, the blended mixture of ethanol or methanol and demineralized water is provided via primary supply pump 106 and backup supply pump 108 when microprocessor based control system 110 triggers the pump to start pumping fluid to accumulator tank 112. The flow of the blended mixture to the accumulator tank 112 is monitored by a flow sensor 114 and provided to control system 110 for feedback control. Level sensor 116 compares the fluid level against minimum level 118 and maximum level 120 to provide data to control system 110 indicating whether the fluid level in the accumulator tank 112 is at or below a minimum level or at or above a maximum level so that the control system 110 can appropriately turn on/off the supply pumps 106 and 108.

As illustrated in FIG. 1, accumulator tank 112 also receives a pressurized air supply that bleeds off of the compressor 122 and is supplied via a modulating valve 124 to the accumulator tank 112 to pressurize the fluid within the accumulator tank 112. A flow sensor 126 provides flow data to the control system 110 so that the control system may detect blockages, compensate for drops in the air pressure in the accumulator tank 112, and otherwise properly regulate air flow through adjustment of modulating valve 124. Pressure sensor 128 measures the pressure of the compressed air in the accumulator tank 112 to provide feedback control data to control system 110. For example, pressure sensor 128 provides an emergency system that maintains the pressure in the accumulator tank 112 at an optimum air pressure for a the required discharge response, which is, in turn, a function of the response time requirements, distance of the piping to the compressor, size of the flow line, etc. For example, an optimum air pressure is an air pressure that delivers effectively lag-free responsiveness in response to detection of an under frequency condition on the power grid. It will be appreciated that after the initial effectively instantaneous discharge of air pressure from the accumulator tank 112 in response to an under frequency condition, the accumulator tank 112 may require up to 1-2 minutes to recharge with pressurized air and fluid from the storage tank 102. Thus, in exemplary embodiments, it is desirable to provide enough air discharge to power the system for 1-2 minutes or at least until the fluid pumps are completely up to speed.

With the electrical grid operating at the standardized grid frequency value, the microprocessor based control system 110 for the under frequency response control system 100 will be dormant but in constant communication with the generator protection panel (GPP) and gas turbine controller 130. Once there is a termination of a negative deviation in grid frequency from the standardized grid frequency range—an under frequency condition, the system 100 will immediately become operational.

With confirmed determination of an under frequency situation, the controller 110 will trigger the release of compressed air from the accumulator tank 112 which will deliver the augmentation fluid flow through modulating valve 132 to the augmentation fluid circuits 134 providing the blended mixture to the compressor bell mouth 136, CDC 138, and/or combustor 140 to aid in power augmentation and control emissions as shown. The gas turbine controller 130 will modulate the Inlet Guide vanes (IGV) 141 to maintain a substantially constant air flow to the compressor 122 to facilitate controlling a fuel to compressor discharge pressure ratio such that a combustor 140 state does not lag changes in air flow when the combustion system responds to the grid frequency deviation.

During the initial discharge with the accumulator based air, the electrical pump (not shown) that is included in the system will start and discharge the augmentation fluid. With this in mind, as the air flow/pressure from the accumulator tank 112 degrades, this electrically driven pump also will be started up by the "trigger" signal and will continue to maintain the flow of diluent into the augmentation fluid circuits 134 for the duration as required to meet the grid code mandate. During this time, the accumulator 112 will be continuously recharged by the compressor bleed air or pressurization pump and will remain pressurized for the next under frequency situation.

In the embodiment of FIG. 1, the control system 110 may selectively control the augmentation fluid circuits 134 through control of modulating valves 142, 144, and 146 in the respective circuits based on the response requirements. In other words, control system 110 may control providing the combination of water and ethanol/methanol into one, two, or a combination of the three possible locations for controlling the turbine 105 based on the degree of measured under frequency condition and response time requirements. For example, the combination of water and ethanol/methanol may be provided via all three flow paths to adjust for a steep frequency drop-off. Alternatively, only one or two control paths may be used for a less significant frequency drop-off.

In an exemplary embodiment, the control system 110 operates under software program control to implement a set of rules for controlling the delivery of the mass flow of the mixture that will be used for augmenting the power output in response to a grid under frequency excursion by selectively controlling the provision of the water and ethanol/methanol mixture from the accumulator tank 112 to the respective flow paths 134. The software program may include in an exemplary embodiment a predetermined algorithm based on turbine operating parameters, grid variations for determining the discharge pressure, and pressure degradation rate for rationing the mass flow augmentation fluid to the respective distribution circuits in response to the detected under frequency condition. As such an algorithm is straightforward for those skilled in the art and depends heavily upon the specific configuration, details of such an algorithm are not provided here. Flow sensors 148, 150, and 152 and pressure sensor 154 provide feedback information to control system 110 for processing by the algorithm and the control system 110, in turn, provides outputs for regulating the flow of the mixture by adjusting the modulating valves 142, 144, and/or 146.

Figure 2:
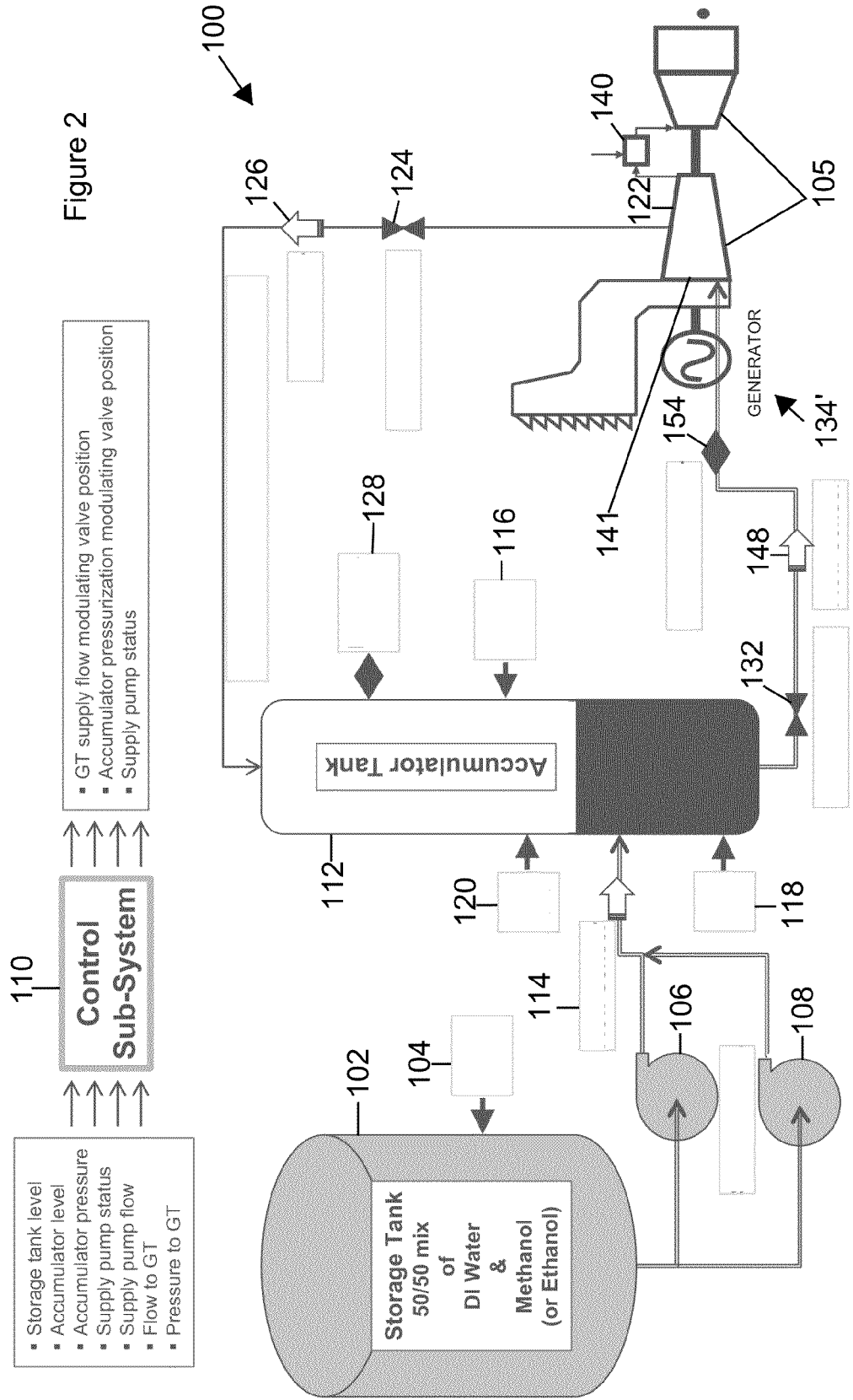
FIG. 2 illustrates a second embodiment of the under frequency response control system.

FIG. 2 illustrates a second embodiment of the under frequency response control system. The embodiment of FIG. 2 is the same as FIG. 1 except that the gas turbine controller 130 is not shown and only a single control path is provided for providing the combination of water and ethanol/methanol into the bell mouth of the compressor 122. Since only one path 134' is provided instead of three paths as in the embodiment of FIG. 1, this embodiment provides for a relatively gross adjustment in comparison with the embodiment of FIG. 1.

Figure 3:
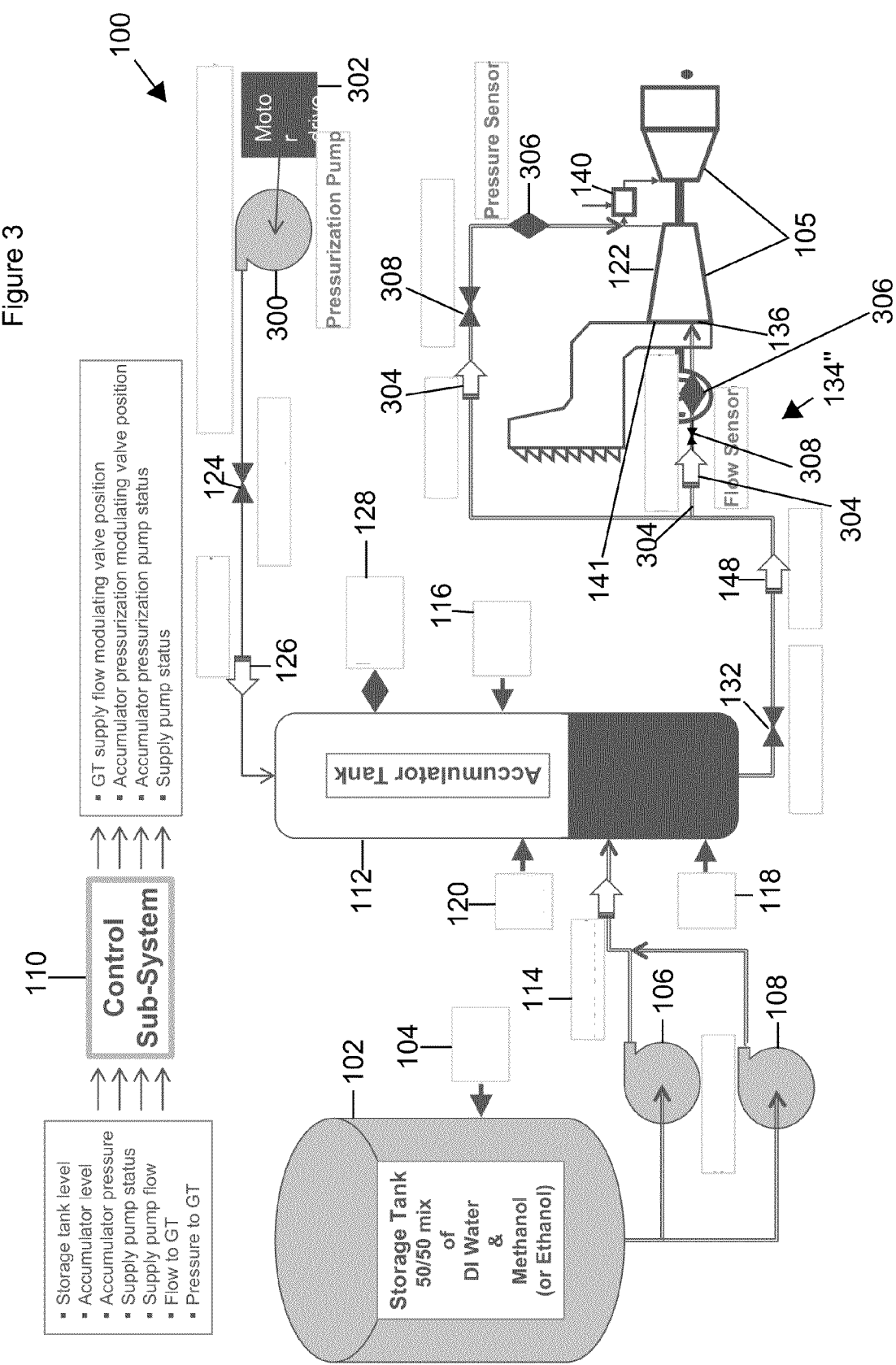
FIG. 3 illustrates a third embodiment of the under frequency response control system.

FIG. 3 illustrates a third embodiment of the under frequency response control system. The embodiment of FIG. 3 is the same as the embodiments of FIGS. 1 and 2 except that the gas turbine controller 130 is not shown and a separate accumulator pressurization air supply is provided by a variable frequency drive (VFD) pressurization pump 300 driven by a motor 302 instead of the bleed off from the compressor 122. Also, in the embodiment of FIG. 3, two flow paths 134" provide the combination of water and ethanol/methanol into the bell mouth 136 of the compressor 122 as well as the option to provide the combination of water and ethanol/methanol to the compressor 122 and/or combustor 140 but not the CDC. As illustrated, flow paths 134" may include flow sensors 304 and pressure sensors 306 for providing feedback information to control system 110 for regulating the flow of the mixture by adjusting the modulating valves 308 in each flow path.

Technical effects and advantages of the under frequency response system and method described herein include enhancement of the mass flow of the unit and coordination of the mass flow with the increase in fuel flow requirements. Further effects and advantages include one or more of the following for each of the illustrated embodiments:

the methanol/ethanol and water mixture evaporates faster and at a lower temperature than water alone, thus allowing for cooler more compressed air to be provided to the turbine for improved response;

the methanol/ethanol and water mixture simultaneously adds fuel together with the increased air mass flow thus allowing for improved combustion system response;

a turbine connected to the Grid may be operated at its true base load capability rating—no de-rating of the gas turbine is required to compensate for the Grid response requirement;

one system may be installed for one or a plurality of units supported by a specifically configured control system;

a system can be integrated with "load sharing system" currently installed on sites with multiple units connected to the same network;

a system when installed will have no impact on plant reliability and heat rate;

the system eliminates the need to operate with sustained dynamics when grids under frequency changes are outside the response capability of the connected machine;

the system provides for the utilization of wide blends of mass flow augmentation motive fluids besides the ethanol/methanol and deionized water described herein;

the system standardizes the grid under frequency response and optimizes control thereof;

the system provides additional tuning capability for the combustion system by selectively providing the combination of water and ethanol/methanol into one, two, or a combination of the three possible locations for controlling the turbine based on the degree of measured under frequency condition and response time requirements;

the system provides a faster response time with shift in frequency, i.e., the accumulator based injection system can ramp up or shut down quicker than a motor driven system to meet the targeted Grid support requirements;

protocols can be changed whereby injection can be included as a part of the Dry Low Nox (DLN) system tuning;

the system may be used in areas of the world where the Grids are very unstable and in situations where customers will have increased revenue for demonstrably improved under frequency response;

the system will lead to a reduction in over firing of turbines to meet under frequency response requirements, thereby improving the useful life of the equipment;

the system can be utilized for power augmentation and NOx abatement; and the system can be easily retrofitted unto older DLN optioned gas turbines.

Operational Notes

Those skilled in the art will appreciate that to meet the needs of the Grid by increasing or decreasing the power to support the frequency, the turbine control system needs to automatically control the increase or decrease in fuel flow to the combustion system. Furthermore, because gas turbines firing for emission compliance is based on fuel to air ratios, the increase or decrease in fuel flow is accompanied by a corresponding opening or closing of the inlet guide vanes (IGVs) 141 to increase or decrease the air flow to the combustor 140 to ensure emission compliant combustion. Uncoordinated increasing or decreasing both the fuel flow and the air flow simultaneously may result in combustion instability/excursions.

Furthermore, to prevent any combustion excursions, fuel flow adjustments are typically initiated prior to air flow adjustments. For gas turbines connected to a network, two parameters are primarily used to facilitate controlling fuel and air flow in response to grid/power demands—measured compressor pressure ratio (CPR) and measured gas turbine exhaust temperature (TTXM). Fuel flow is controlled by a fuel valve position, and air flow is controlled by a compressor inlet guide vane position. CPR and TTXM are also used to define a state of the combustion system by controlling a fuel distribution/split to the combustor nozzles. The fuel split is sensed and controlled by a valve positioned in each of the combustor fuel legs. As such, a change in fuel flow demanded and/or air flow demanded will not result in a change to combustor fuel splits until the fuel flow/air flow changes produce a change in CPR or TTXM. As such, by design, the combustor state lags behind the state of the gas turbine engine.

Because of combustor state lags, large grid fluctuations, which generally cause rapid changes in fuel flow/air flow, may result in abnormal combustor operations. Specifically, during operations in which fuel flow is being decreased, the combustor may be susceptible to lean fuel blowout. Moreover, operating with lean fuel conditions may change dynamic pressure oscillations within the combustor, resulting in combustor instability. In addition, during operations in which fuel flow is being increased, combustor dynamic pressure oscillations may be generated which may cause combustor instability. Ultimately, combustor instability and/or a flame out may result in loss of power to the electric power Grid. These conditions may be addressed by using the system described above to provide more precise control of the fluid supply to the compressor 122 and gas turbine 105 during normal operation. These and other modifications to the system describe above will be apparent to those skilled in the art.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A turbine control system that controls provision of fuel and air to a turbine engine and/or an air compressor that provides compressed air to said turbine engine, said turbine engine being connected to a power grid to provide generated power thereto, said system comprising:
   at least one sensor that monitors frequency fluctuations of said power grid from a standardized grid frequency value;
   an accumulator that stores a mixture of water and a motive fuel under pressure; and
   a controller that adjusts fuel and air flow to the turbine engine in response to detected grid frequency fluctuations, said controller providing the pressurized mixture of water and motive fuel to at least said compressor to augment mass flow to said turbine engine when said at least one sensor detects an under frequency condition of said power grid.

2. A turbine control system as in claim 1, wherein the motive fuel comprises at least one of: ethanol, methanol, or any combination thereof.

3. A turbine control system as in claim 1, wherein an output of said accumulator is arranged so as to selectively provide said mixture of water and motive fuel via a first flow path to a bellmouth of said compressor, via a second flow path to a compressor discharge chamber at an output of said compressor, via a third flow path to a combustion system of said turbine engine under control of said controller; or to any combination thereof.

4. A turbine control system as in claim 3, wherein said controller is programmed with a set of rules for controlling the delivery of the mass flow of the mixture that will be used for augmenting power output of the turbine engine in response to a detected under frequency condition of said power grid so as to selectively provide said mixture of water and motive fuel to said first, second and/or third flow path based on a degree of detected under frequency condition and response time requirements for correcting a detected under frequency condition.

5. A turbine control system as in claim 4, wherein said controller includes a processor that processes software to implement an algorithm based on turbine operating parameters, grid variations for determining the discharge pressure, and pressure degradation rate for rationing the mixture of water and motive fuel to the first, second and/or third flow paths in response to the detected under frequency condition.

6. A turbine control system as in claim 1, further comprising an air pressurization system that continuously charges said accumulator to a pressure that delivers effectively lag-free responsiveness in response to detection of an under frequency condition of said power grid.

7. A turbine control system as in claim 6, wherein said air pressurization system comprises a flow channel that provides compressor bleed to said accumulator under control of said controller.

8. A turbine control system as in claim 6, wherein said air pressurization system comprises a variable frequency discharge air pump.

9. A method of controlling the supply of fuel and air to a turbine engine and/or an air compressor that provides compressed air to said turbine engine, said turbine engine being connected to a power grid to provide generated power thereto, said method comprising:
- detecting an under frequency deviation of said power grid from a standardized grid frequency value;
- adjusting mass augmentation flow to at least said compressor by providing a pressurized mixture of water and a motive fuel to at least said compressor to augment mass flow to said turbine engine when said under frequency deviation of said power grid is detected.

10. A method as in claim 9, further comprising maintaining constant air flow from the compressor by modulating inlet guide vanes and fuel flow to the compressor and turbine engine to facilitate controlling a fuel to compressor discharge pressure ratio such that a combustor state of the turbine engine does not lag changes in air flow when a combustor of the turbine engine responds to the frequency deviation of said power grid.

11. A method as in claim 9, further comprising selectively providing said mixture of water and motive fuel via a first flow path to a bellmouth of said compressor, via a second flow path to a compressor discharge chamber at an output of said compressor, via a third flow path to a combustion system of said turbine engine under control of said controller, or via any combination thereof.

12. A method as in claim 11, wherein said providing of said mixture of water and motive fuel comprises processing an algorithm based on turbine operating parameters, grid variations for determining the discharge pressure, and pressure degradation rate for rationing the mixture of water and motive fuel to the first, second and/or third flow paths in response to the detected under frequency condition and selectively providing the mixture of water and motive fuel to said first, second and/or third flow path to correct said under frequency condition.

13. A method as in claim 9, further comprising pressurizing said mixture of water and motive fuel to a pressure that delivers effectively lag-free responsiveness in response to determination of an under frequency deviation of said power grid.

* * * * *